United States Patent
Takemura (10) Patent No.: US 11,370,096 B2
(45) Date of Patent: Jun. 28, 2022

(54) BINDING MACHINE

(71) Applicant: MAX CO., LTD., Tokyo (JP)

(72) Inventor: Hajime Takemura, Tokyo (JP)

(73) Assignee: MAX CO., LTD., Tokyo (JP)

( * ) Notice: Subject to any disclaimer, the term of this patent is extended or adjusted under 35 U.S.C. 154(b) by 0 days.

(21) Appl. No.: 16/998,962

(22) Filed: Aug. 20, 2020

(65) Prior Publication Data

US 2021/0053199 A1 Feb. 25, 2021

(30) Foreign Application Priority Data

Aug. 23, 2019 (JP) .............................. JP2019-153174

(51) Int. Cl.
*B25C 5/02* (2006.01)
*B25C 5/16* (2006.01)
*B65B 13/34* (2006.01)

(52) U.S. Cl.
CPC .......... *B25C 5/0207* (2013.01); *B25C 5/0285* (2013.01); *B25C 5/1686* (2013.01); *B65B 13/345* (2013.01)

(58) Field of Classification Search
CPC ... B25C 5/0207; B25C 5/0285; B25C 5/1686; B65B 13/345; B65B 13/025; B65B 13/18; A01G 17/08; A01G 7/06; A01G 17/085; A01G 9/128
See application file for complete search history.

(56) References Cited

U.S. PATENT DOCUMENTS

| | | | | | |
|---|---|---|---|---|---|
| 3,603,497 | A | * | 9/1971 | Nishikawa | A01G 17/085 140/123 |
| 3,762,621 | A | * | 10/1973 | Nishikawa | A01G 17/085 227/124 |
| 3,771,707 | A | * | 11/1973 | Nishikawa | B65B 13/02 156/530 |
| 6,968,988 | B2 | * | 11/2005 | Hayashi | A01G 17/085 227/76 |
| 9,736,997 | B2 | * | 8/2017 | Cho | A01G 17/085 |
| 10,548,266 | B2 | * | 2/2020 | Taguchi | B65B 13/185 |

(Continued)

FOREIGN PATENT DOCUMENTS

| | | |
|---|---|---|
| EP | 2870862 A1 | 5/2015 |
| JP | 2004-175377 A | 6/2004 |

(Continued)

OTHER PUBLICATIONS

The Search Report for EP 20191958.6 dated Jan. 21, 2021 (7 pages).

*Primary Examiner* — Thomas M Wittenschlaeger
*Assistant Examiner* — Katie L Gerth
(74) *Attorney, Agent, or Firm* — Weihrouch IP (57) ABSTRACT

A binding machine, includes: a staple magazine unit configured to accommodate a staple having a crown portion and a pair of leg portions; a staple driver provided at a position facing the crown portion; a clincher provided at a position facing tip ends of the leg portions and movable along an extending direction of the leg portions; and a regulating portion configured to regulate a movement amount of the clincher toward the leg portions. The clincher and the staple driver are configured to sandwich the staple therebetween with a movement of the clincher along the extending direction toward the leg portions, folding the staple.

3 Claims, 12 Drawing Sheets

(56) References Cited

U.S. PATENT DOCUMENTS

| | | | |
|---|---|---|---|
| 10,717,555 B2* | 7/2020 | Ishiguro | B65B 13/345 |
| 10,787,282 B2* | 9/2020 | Takemura | A01G 17/08 |
| 2005/0028497 A1* | 2/2005 | Hayashi | A01G 17/08 |
| | | | 53/592 |
| 2006/0273134 A1* | 12/2006 | Smith | B25C 5/0207 |
| | | | 227/131 |
| 2011/0079625 A1* | 4/2011 | Huang | B25C 5/025 |
| | | | 227/61 |
| 2013/0001269 A1* | 1/2013 | Aoki | B25C 5/1617 |
| | | | 227/155 |
| 2013/0125461 A1* | 5/2013 | Seo | A01G 17/08 |
| | | | 47/1.01 S |
| 2014/0054352 A1* | 2/2014 | Chang | B25C 5/0242 |
| | | | 227/120 |
| 2014/0231487 A1* | 8/2014 | Abe | B25C 5/0285 |
| | | | 227/129 |
| 2017/0361959 A1 | 12/2017 | Ishiguro et al. | |

FOREIGN PATENT DOCUMENTS

| | | |
|---|---|---|
| JP | 2017-222396 A | 12/2017 |
| WO | 2009031667 A1 | 3/2009 |
| WO | 2011078202 A1 | 6/2011 |

* cited by examiner

BINDING MACHINE

CROSS REFERENCE TO RELATED APPLICATIONS

This application claims priority to Japanese Patent Application No. 2019-153174 filed on Aug. 23, 2019, the content of which is incorporated herein by reference.

TECHNICAL FIELD

The present invention relates to a binding machine.

BACKGROUND ART

A horticultural binding machine has been used for binding work during cultivating of agricultural crops. For example, in cultivating of agricultural crops such as cucumbers, grapes, tomatoes, pears, and plums, a horticultural binding machine has been used in order to bind vines and stems of plants to struts and nets. The binding machine drives staples from a staple magazine unit to fix end portions of a binding tape. The binding machine includes a staple driver which drives one staple each time.

The binding machine described in JP-A-2017-222396 includes a tape gripping device capable of reliably holding a tape. FIGS. 21 and 22 of JP-A-2017-222396 show a state in which a staple 61 is driven by a staple driver 18 when an operating handle 50 is gripped and a clincher arm 30 is rotated in a closing direction with respect to a main handle 11. Leg portions of the staple 61 are clinched by a clincher 33 of the clincher arm 30.

A binding machine described in JP-A-2004-175377 includes a plate spring for preventing a tape from moving backward. FIG. 3 in JP-A-2004-175377 shows a staple driver 11 arranged such that a front end thereof abuts with a front wall of a staple magazine 7. Leg portions of a staple driven by the staple driver 11 are clinched by a clincher 12.

However, when the operating handle is excessively gripped during the binding operation of clinching the staple, a large load may be applied to the staple driver from the clincher. Limiting movement of the operating handle such that the handle is not gripped more than necessary may prevent a large load from being applied to the staple driver. However, when a dimensional tolerance of a product is taken into consideration, a front end of the staple driver may be greatly displaced from an expected clinch completion position. In that case, an excessive load is applied to the staple driver, which may result in damage to the staple driver.

SUMMARY OF INVENTION

Embodiments of the present invention provide a binding machine that can limit a load to be applied to a staple driver and can prevent damage to the staple driver.

According to an aspect of the present invention, a binding machine, includes: a staple magazine unit configured to accommodate a staple having a crown portion and a pair of leg portions; a staple driver provided at a position facing the crown portion; a clincher provided at a position facing tip ends of the leg portions and movable along an extending direction of the leg portions; and a regulating portion configured to regulate a movement amount of the clincher toward the leg portions. The clincher and the staple driver are configured to sandwich the staple therebetween with a movement of the clincher along the extending direction toward the leg portions, folding the staple.

DESCRIPTION OF EMBODIMENTS

Hereinafter, embodiments of the present invention will be described with reference to the drawings. The following embodiments are examples for describing the present invention and are not intended to limit the present invention to only the embodiments. In the present embodiment, for convenience, a side (a right side in FIG. 1) toward which a tape holder 28A extends from a tape magazine unit 26 in which the tape TP for binding is accommodated, heading for a tape guide 28B provided at a distal end of a binding machine 10 from which the tape TP is pulled out, may be referred to as a "front side", and an opposite side (a left side in FIG. 1) may be referred to as a "rear side". Further, a side (upper side in FIG. 1) toward which the tape TP is pulled out from the tape guide 28B, heading for a tape holding unit 56 in a standby state, may be referred to as an "upper side", and an opposite side (lower side in FIG. 1) may be referred to as a "lower side".

Figure 1:
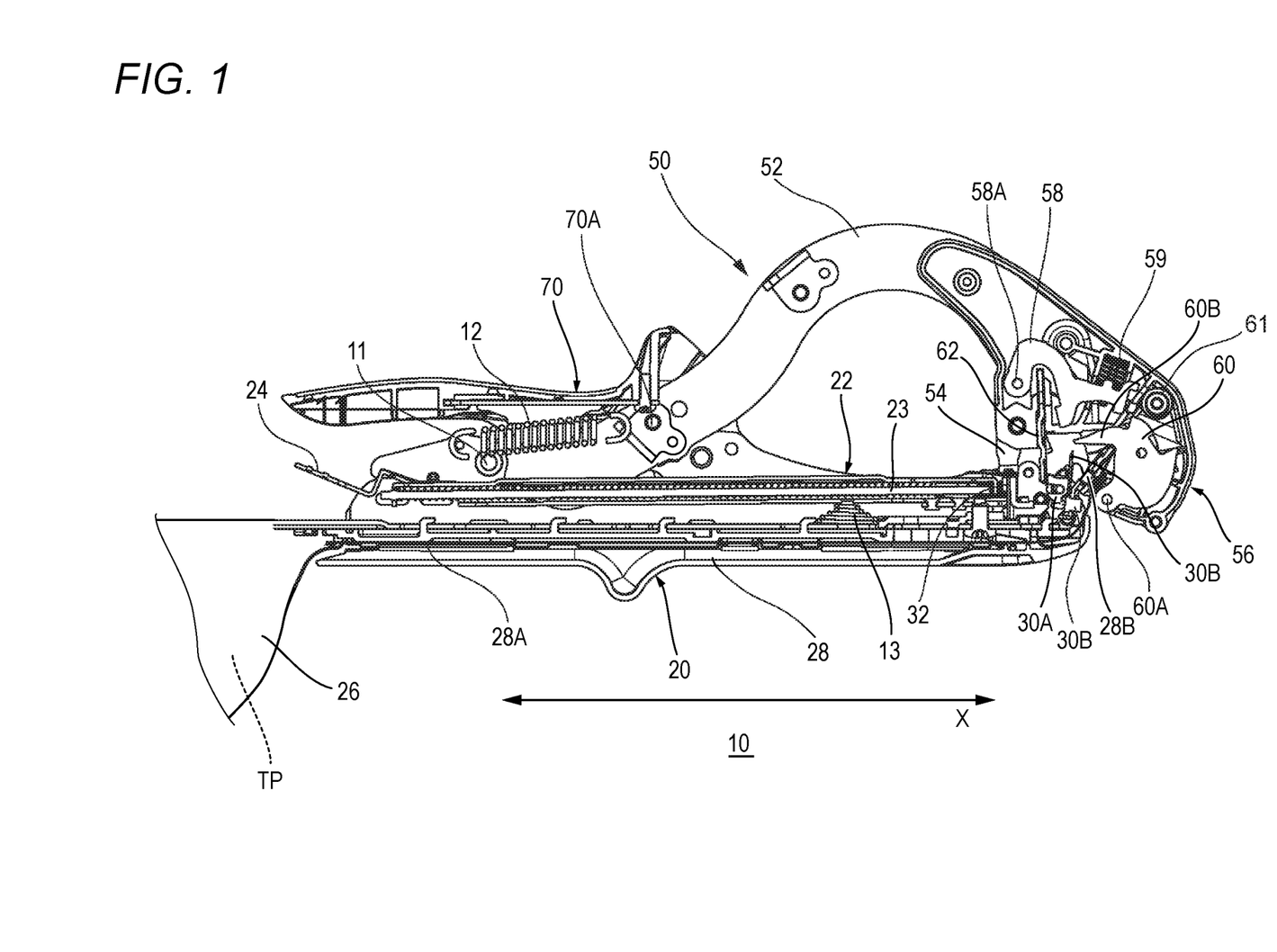
FIG. 1 is a cross-sectional view showing an internal structure of a binding machine common among respective embodiments of the present invention.

First, a configuration common among respective embodiments of the present invention will be described with reference to FIG. 1. FIG. 1 is a cross-sectional view showing an internal structure of the binding machine 10 common among the respective embodiments of the present invention. The binding machine 10 for gardening according to the present embodiment can be used, for example, in attraction binding operations on an agricultural crop (an example of an "object S to be bound"). The binding machine 10 includes a main handle 20, a staple magazine unit 22 rotatably attached to the main handle 20, a clincher arm 50 rotatably attached to the main handle 20, and an operation handle 70 rotatably attached to the clincher arm 50.

The main handle 20 is a member formed in an elongated linear shape. The main handle 20 includes a tape transport unit 28, a tape cutting unit 30, and a staple driver 32. A tape magazine unit 26 is attached to a rear end portion of the main handle 20. The main handle 20 and the tape magazine unit 26 may be integrally formed.

The tape magazine unit 26 is a mechanism that accommodates the tape TP wound on a reel (hereinafter, the wound tape TP may be referred to as a tape reel TR (an example of a "wound binding tape")). The tape magazine unit 26 is provided at the rear end portion of the main handle 20.

The tape transport unit 28 includes the tape holder 28A and the tape guide 28B. The tape holder 28A is a path for transporting the tape TP from the tape magazine unit 26 to the tape guide 28B, and is laid along a longitudinal direction X of the main handle 20. The tape holder 284 includes a bottom portion facing one surface of the tape TP, and a lid portion facing the other surface of the tape TP (hereinafter, the other surface of the tape TP may be referred to as a "back surface"). The bottom portion and the lid portion are configured to be openable and closable with one side along the longitudinal direction X as a fulcrum, for example.

The tape guide 28B is a member that guides a tip of the tape TP upward from the tape holder 28A. The tape guide 28B is rotatably provided at a front end portion of the main handle 20. The tape guide 28B has wall surfaces facing at least a part of each of a front surface, a back surface, and both side portions of the tape TP, so as for the inserted tape TP not to come off easily.

The tape cutting unit 30 includes a cutting blade 30A that cuts the tape TP, and a lock mechanism 30B that locks and unlocks the cutting blade 304. During replacement of the cutting blade 30A, the lock mechanism 30B releases locking of the cutting blade 304 and the cutting blade 30A is removed. The cutting blade 30A is provided rotatably and integrally with the tape guide 28B, and is biased by an elastic member (not illustrated) so as to face the rear side during a standby state and a holding operation. When performing a binding operation, the tape guide 289 is pressed against a tip portion 60B of a tape catch 60, the tape guide 28B and the cutting blade 30A rotate against a biasing force of the elastic member (not illustrated), and a tip portion of a blade edge of the cutting blade 30A moves so as to face the tape TP.

As a mechanism that cuts the tape TP, various mechanisms can be employed. For example, the tape TP may be rotated in conjunction with the tape guide 283, thereby cutting the tape TP; the tape guide 283 and the cutting blade 30A may be configured to be movable in a straight advancing direction and the cutting blade 30A may be moved in a linear direction, thereby cutting the tape TP; and a member restraining the tape TP such as the tape guide 28B may be moved so as to cause the tape TP to be cut by the stationary cutting blade 30A.

The staple driver 32 is a plate that is attached to the main handle 20 so as to face a vicinity of a front end of a staple accommodating portion 23 of the staple magazine unit 22. The staple driver 32 is formed to have a thickness, for example, substantially the same as a width of a staple ST or smaller than the width of the staple ST so as to drive only one staple ST.

When the clincher arm 50 to be described below rotates in a closing direction with respect to the main handle 20, the staple magazine unit 22 is pressed by the clincher arm 50 to rotate in a direction of approaching the main handle 20. Therefore, an upper end of the staple driver 32 attached to the main handle 20 relatively enters a space in the staple accommodating portion 23 to drive a leading staple ST in the staple accommodating portion 23 upward. The configuration of the staple driver 32 will be described in detail later.

The driven staple ST is clinched by a clincher 54 after penetrating the tape TP. Two overlapped tapes TP can be held between bent leg portions of the staple ST and a crown portion 100 of the staple ST.

The staple magazine unit 22 is a member formed in an elongated linear shape. A rear end portion of the staple magazine unit 22 is attached to the rear end portion of the main handle 20 so as to be rotatable around a rotation shaft. However, since a rotation angle thereof is small, the staple magazine unit 22 may be expressed as being swingably attached to the main handle 20.

A hook 22A is attached to a from end of the staple magazine unit 22. The hook 22A is locked with a shaft 14 fixed to the main handle 20. The staple magazine unit 22 is biased by a coil spring 13 in a direction away from the main handle 20. The staple magazine unit 22 can rotate toward the main handle 20 against a biasing force of the coil spring 13. Meanwhile, when the hook 22A abuts with the shaft 14, the hook 22A cannot be separated from the main handle 20 more than the position thereof.

The staple magazine unit 22 includes the staple accommodating portion 23 that accommodates the staple ST, and a pusher unit 24. The staple accommodating portion 23 is disposed along the longitudinal direction of the main handle 20. In order to accommodate the staple ST therein, the staple accommodating portion 23 includes a bottom surface formed to be elongated along the longitudinal direction of the main handle 20, two sidewall surfaces standing from the bottom surface and facing each other, and a front wall surface against which a side surface of the leading staple ST is pressed. A configuration of the staple magazine unit 22 will be described in detail later.

In the staple accommodating portion 23, a plurality of staples ST can be accommodated. Adjacent staples ST can be connected to each other with an adhesive, for example, to form a column of a staple group as a whole.

The pusher unit 24 is, for example, a member removably attached to the staple accommodating portion 23 in order to push the staples ST accommodated in the staple accommodating portion 23 forward. The pusher unit 24 includes a compression spring that pushes staples ST at the rear end among the plurality of staples ST forward, and a cover that covers the staple accommodating portion 23 from above. By pulling out the pusher unit 24 from the staple accommodating portion 23 and opening the staple accommodating portion 23 to above, the staples ST can be set in the staple accommodating portion 23 from above.

The clincher arm 50 is attached by a rotation shaft portion 11 provided in a vicinity of a rear end portion so as to be rotatable with respect to the main handle 20, and is biased by a tension spring 12 in a direction in which an angle between the clincher arm 50 and the main handle 20 increases. The clincher arm 50 includes an arm portion 52, the clincher 54, and the tape holding unit 56 (an example of a "holding unit"). The arm portion 52 has a shape that extends in a curved manner up to a tip portion so that a C-shaped opening can be formed between the arm portion 52 and the main handle 20.

The clincher 54 is a member that bends and clinches leg portions of the staple ST. The clincher 54 is provided at a tip portion of the clincher arm 50 so as to face a tip of the staple driver 32 when the clincher arm 50 rotates in the closing direction.

With such a configuration, the leg portions of the staple ST driven by the staple driver 32 are clinched by the clincher 54 and bent inward. The configuration including the clincher 54 that is provided on the clincher arm 50 and that is for performing binding processing may be referred to as a "binding portion".

The tape holding unit 56 is a mechanism that holds an end portion of the tape TP pulled out from the tape guide 28B at a tip of the main handle 20. The tape holding unit 56 is provided at a tip of the arm portion 52 of the clincher arm 50. The tape holding unit 56 includes a lock plate 58, the tape catch 60, and a tape plate 62.

The lock plate 58 is configured to be rotatable with a shaft portion 58A provided at one end portion thereof serving as a fulcrum, and the other end portion thereof is biased toward the tape catch 60 by a coil spring 59. The lock plate 58 locks the tape catch 60 by engaging with the tape catch 60 under the biasing of the coil spring 59, and can fix the tape catch 60 at a position separated from the tape plate 62.

The tape catch 60 is provided so as to be rotatable with a shaft portion 60A serving as a fulcrum, and is biased toward the tape plate 62 by a torsion coil spring 61. The tape catch 60 is configured such that, when locking by the lock plate 58 is released at the time of pulling out of the tape, the tip portion 60B having a tapered shape is moved toward the tape plate 62 under the biasing of the torsion coil spring 61.

The tape plate 62 is disposed to face the tape catch 60, and a tip portion thereof extends from the lock plate 58 toward the tape cutting unit 30. The extended portion of the tape plate 62 and the tip portion 60B of the tape catch 60 clamp the tape TP. When a user reduces a force of gripping the operation handle 70 while the tape TP is being held, the clincher arm 50 is rotated in the opening direction by the tension spring 12, and thus the tape TP can be pulled upward via the tape guide 28B.

The operation handle 70 is a portion to be gripped by the user. A shaft portion 70A at a substantially intermediate part thereof is rotatably attached to the clincher arm 50, and a front end portion of the operation handle 70 is attached to the main handle 20. With such a configuration, the clincher arm 50 is configured to be openable and closable relative to the main handle 20 according to an opening/closing operation of the operation handle 70, based on a principle of leverage using a portion to be gripped by a user as a force application point, a rotation shaft of the clincher arm 50 as a fulcrum, and the front end portion attached to the main handle 20 as an action point.

The clincher arm 50 is constantly biased by the tension spring 12, and in a standby state, the clincher arm 50 is in an open state with respect to the main handle 20. When a user grips the operation handle 70 and the main handle 20, as shown in FIG. 1, the clincher arm 50 rotates in a closing direction with respect to the main handle 20. The gripping operation is performed in a first gripping operation, and the binding operation is performed in a second gripping operation. The binding machine 10 can bind the binding object S by alternately performing a gripping operation and a binding operation.

Figure 2:
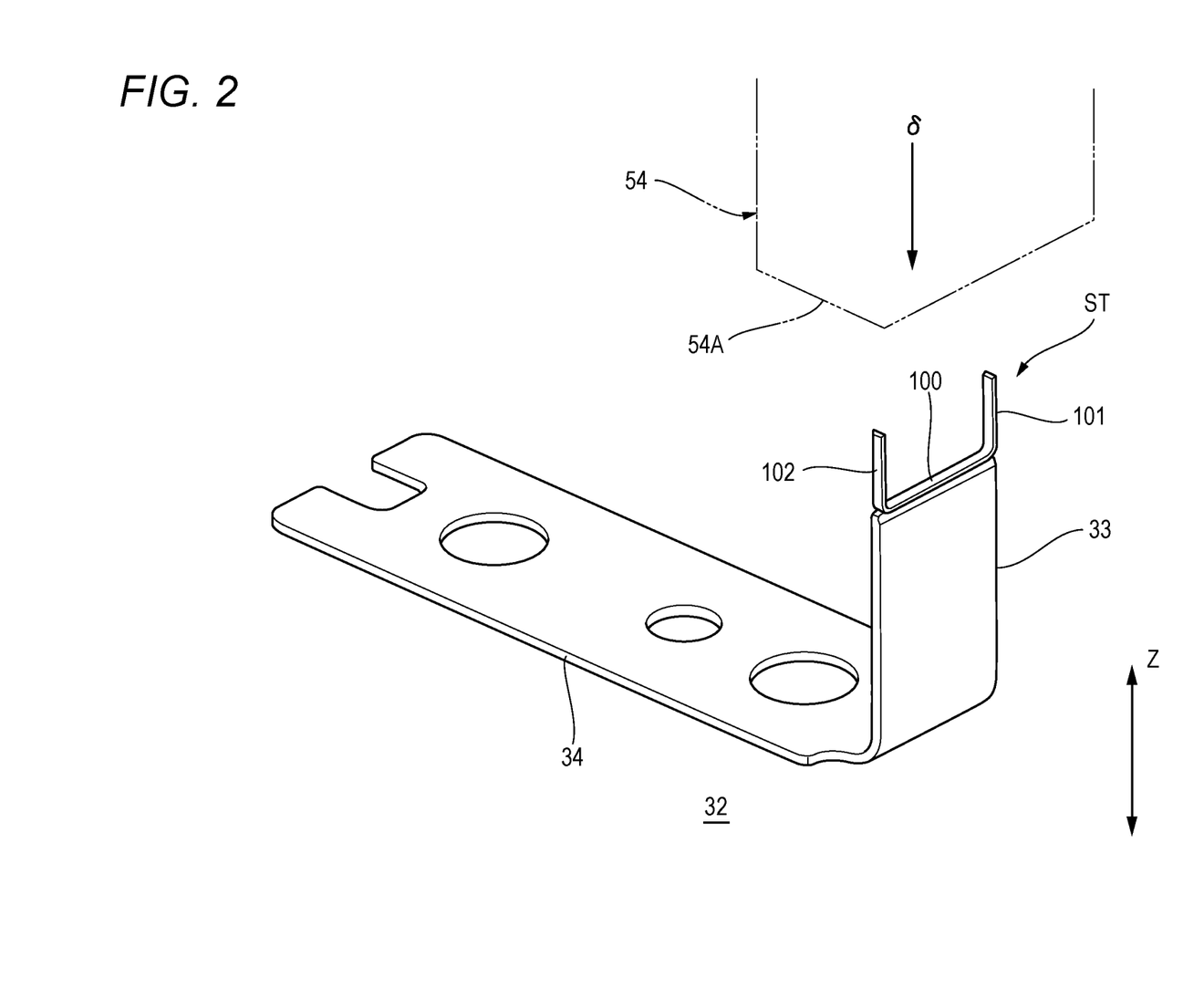
FIG. 2 is a perspective view showing a staple driver in a state where driving of a staple is started.

FIG. 2 is a perspective view of the staple driver 32 that drives the staple ST in the second gripping operation. As shown in FIG. 2, the staple driver 32 is formed of a leaf spring or the like which is bent into an L shape, and the staple driver 32 includes a driving portion 33 for driving the staple ST, and an attachment portion 34 fixed to the main handle 20.

The staple ST is formed in a U shape having the crown portion 100 extending linearly and a pair of leg portions 101, 102 extending upward from both ends of the crown portion 100. The driving portion 33 is provided at a position facing the crown portion 100.

The clincher 54 is provided at a position facing front end portions of the leg portions 101, 102. The clincher 54 is configured to be movable along an extending direction Z of the leg portions 101, 102 following the gripping operation of the operation handle 70 and the main handle 20. When the clincher 54 moves toward the leg portions 101, 102 along the extending direction Z of the leg portions 101, 102, the staple ST is sandwiched between the clincher 54 and the staple driver 32 and is folded.

Hereinafter, a characteristic structure of the binding machine 10 of each embodiment of the present invention will be described in detail. The binding machine 10 according to each embodiment of the present invention is characterized in including a regulating portion 75 for regulating a movement amount δ of the clincher 54 toward the leg portions 101, 102. The regulating portion 75 according to first to fourth embodiments regulates the movement amount δ of the clincher 54 by abutting with a clinch surface 54A of the clincher 54. The regulating portion 75 according to fifth to seventh embodiments regulates the movement amount δ of the clincher 54 by regulating a rotation amount of the clincher arm 50.

First Embodiment

Figure 3:
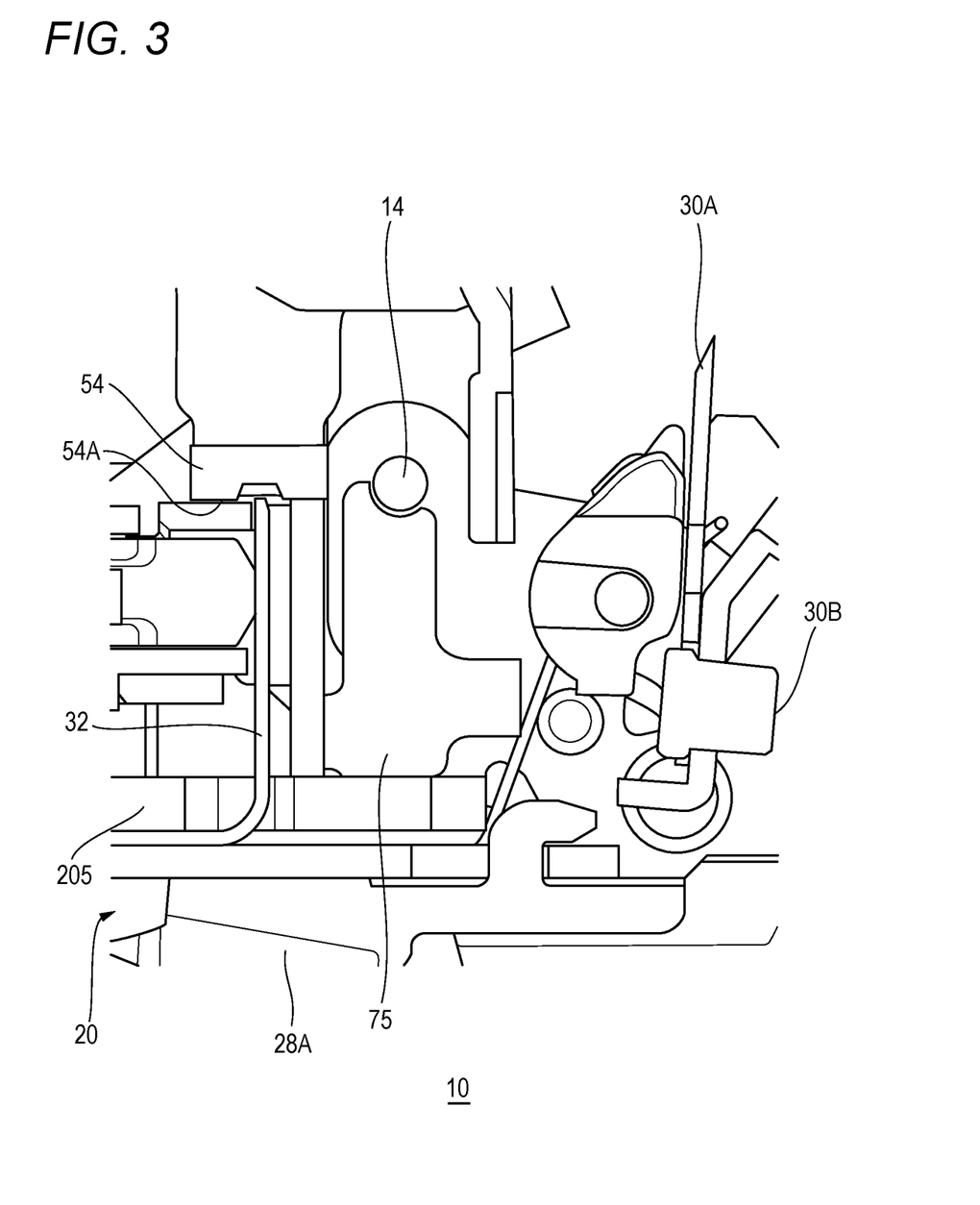
FIG. 3 is a cross-sectional view showing a regulating portion according to a first embodiment of the present invention.

FIG. 3 is a cross-sectional view showing the regulating portion 75 according to a first embodiment of the present invention. As shown in FIG. 3, the regulating portion 75 abuts with the clinch surface 54A of the clincher 54, and prevents movement of the clincher 54 in the extending direction of the leg portions 101, 102 of the staple ST, that is, in the rotation direction Z of the clincher arm 50. In the illustrated example, the regulating portion 75 is configured as an independent sheet metal member and is placed on a rigid member 205 forming a skeleton of the main handle 20.

Figure 4:
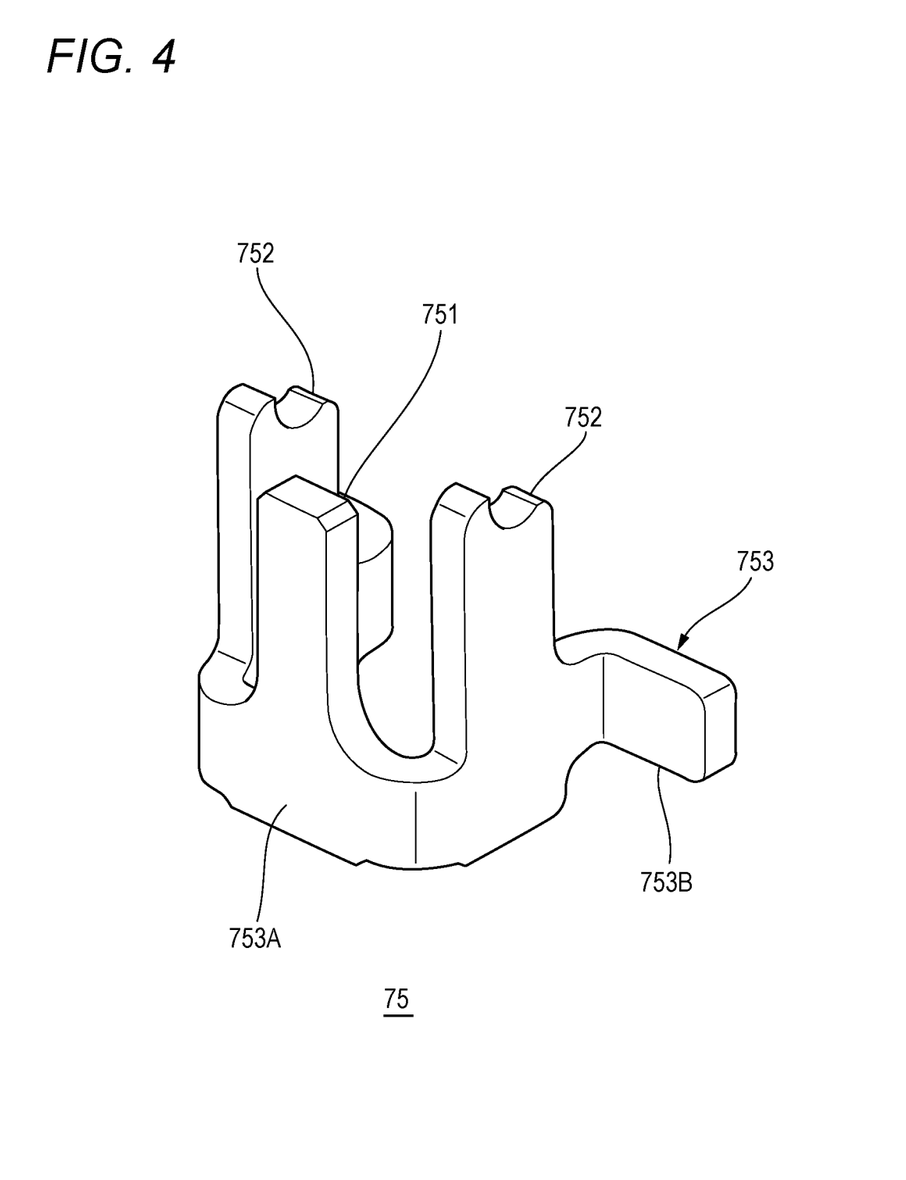
FIG. 4 is a perspective view of the regulating portion shown in FIG. 3 as viewed from a right rear side.

FIG. 4 is a perspective view of the regulating portion 75 shown in FIG. 3 as viewed from a right rear side. In the illustrated example, the regulating portion 75 includes a base portion 753 supported by the main handle 20, an abutting portion 751 protruding from the base portion 753, and a pair of left and right bearing portions 752.

The base portion 753 includes a central portion 753A that extends along the rigid member 205 of the main handle 20 and is bent into a U shape, and blade portions 753B that protrude outward in a width direction of the main handle 20 from both ends of the central portion 753A. The abutting portion 751 abuts with the clinch surface 54A of the clincher 54 to regulate a height of the clinch surface 54A.

Figure 5:
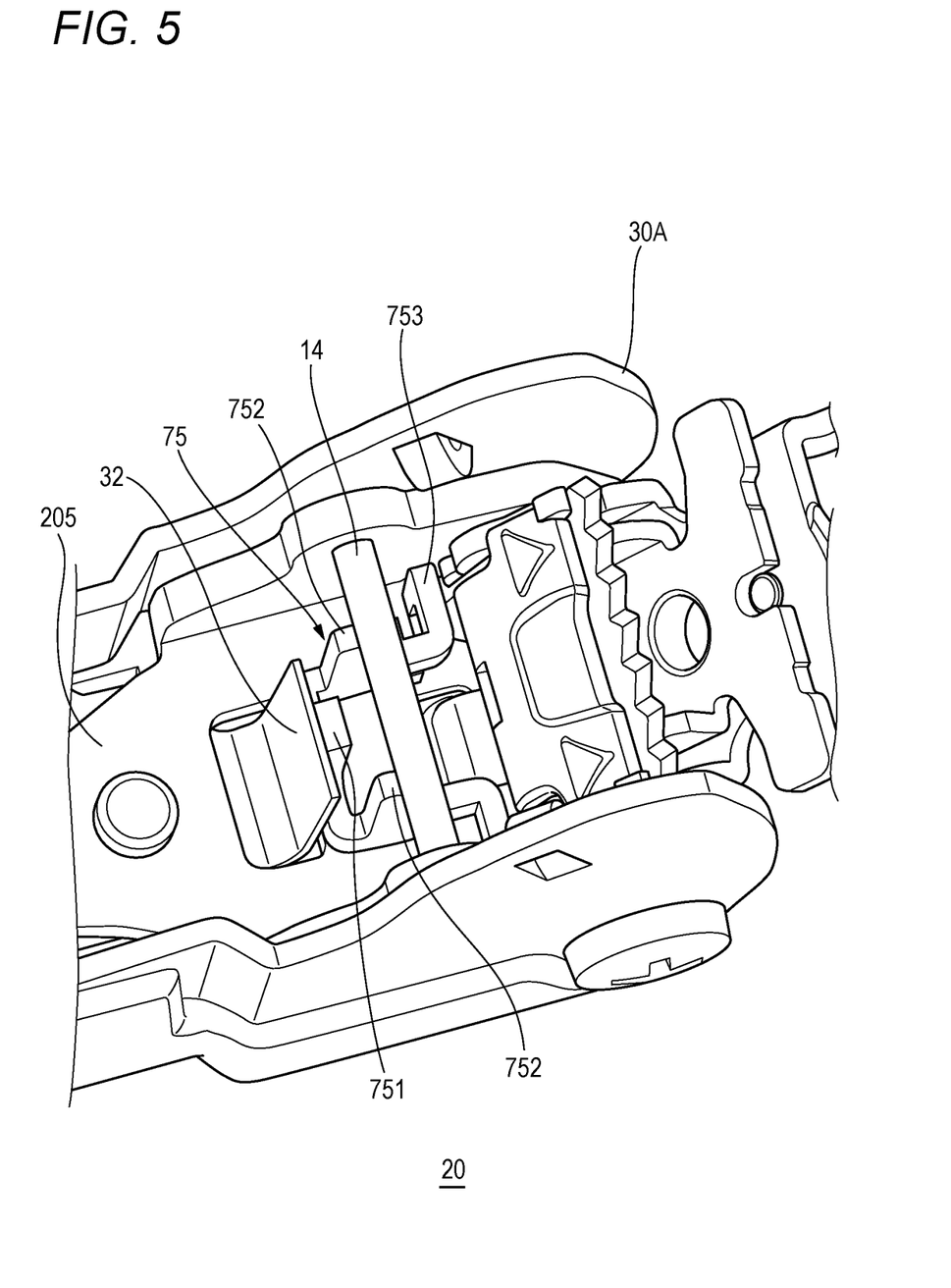
FIG. 5 is a perspective view showing a state where the regulating portion shown in FIG. 4 is attached to a main handle.

FIG. 5 is a perspective view showing a state in which the regulating portion 75 shown in FIG. 4 is attached to the main handle 20. As shown in FIG. 5, the bearing portions 752 abut with the shaft 14 of the main handle 20, By abutting the bearing portions 752 with the shaft 14, the regulating portion 75 is positioned in the longitudinal direction (front-rear direction) X of the main handle 20 and the rotation direction (upper-lower direction) Z of the clincher arm.

According to the binding machine 10 of the first embodiment of the present invention configured as described above, the movement amount δ of the clincher 54 can be regulated by the regulating portion 75 abutting with the clinch surface 54A of the clincher 54. Therefore, a load to be applied to the staple driver 32 can be limited and damage to the staple driver 32 can be prevented.

Second Embodiment

Figure 6:
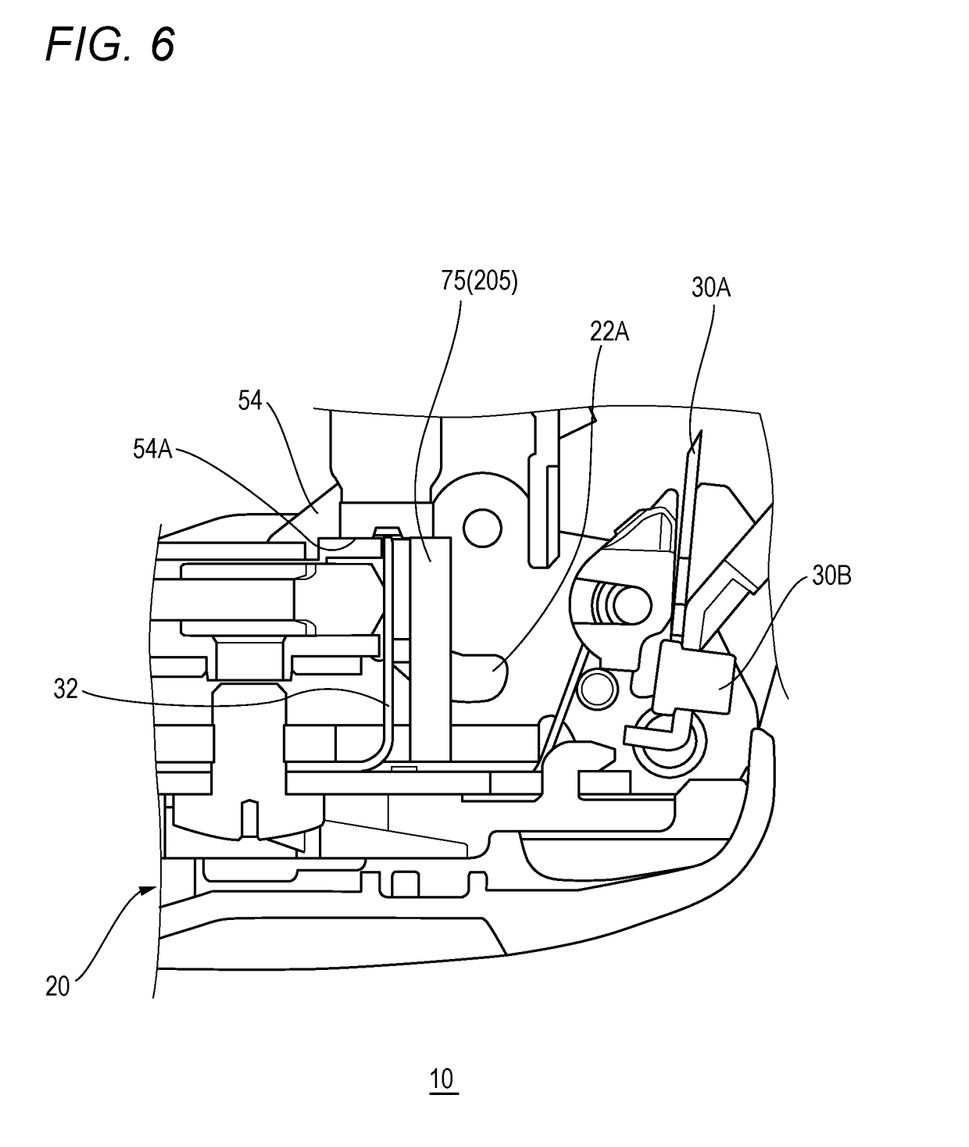
FIG. 6 is a cross-sectional view showing the regulating portion according to a second embodiment of the present invention.

FIG. 6 is a cross-sectional view showing the regulating portion 75 according to a second embodiment of the present invention. The second embodiment is different from the first embodiment in that the regulating portion 75 is formed integrally with the rigid member 205 of the main handle 20. According to the second embodiment, as in the first embodiment, a load to be applied to the staple driver 32 can be limited by regulating the movement amount δ of the clincher 54.

Since the regulating portion 75 is formed integrally with the rigid member 205 of the main handle 20, the regulating portion 75 is not displaced from the main handle 20. A height of the clinch surface 54A can be regulated more accurately. Since the number of components is reduced, the manufacturing costs of the binding machine 10 can be reduced.

Third Embodiment

Figure 7:
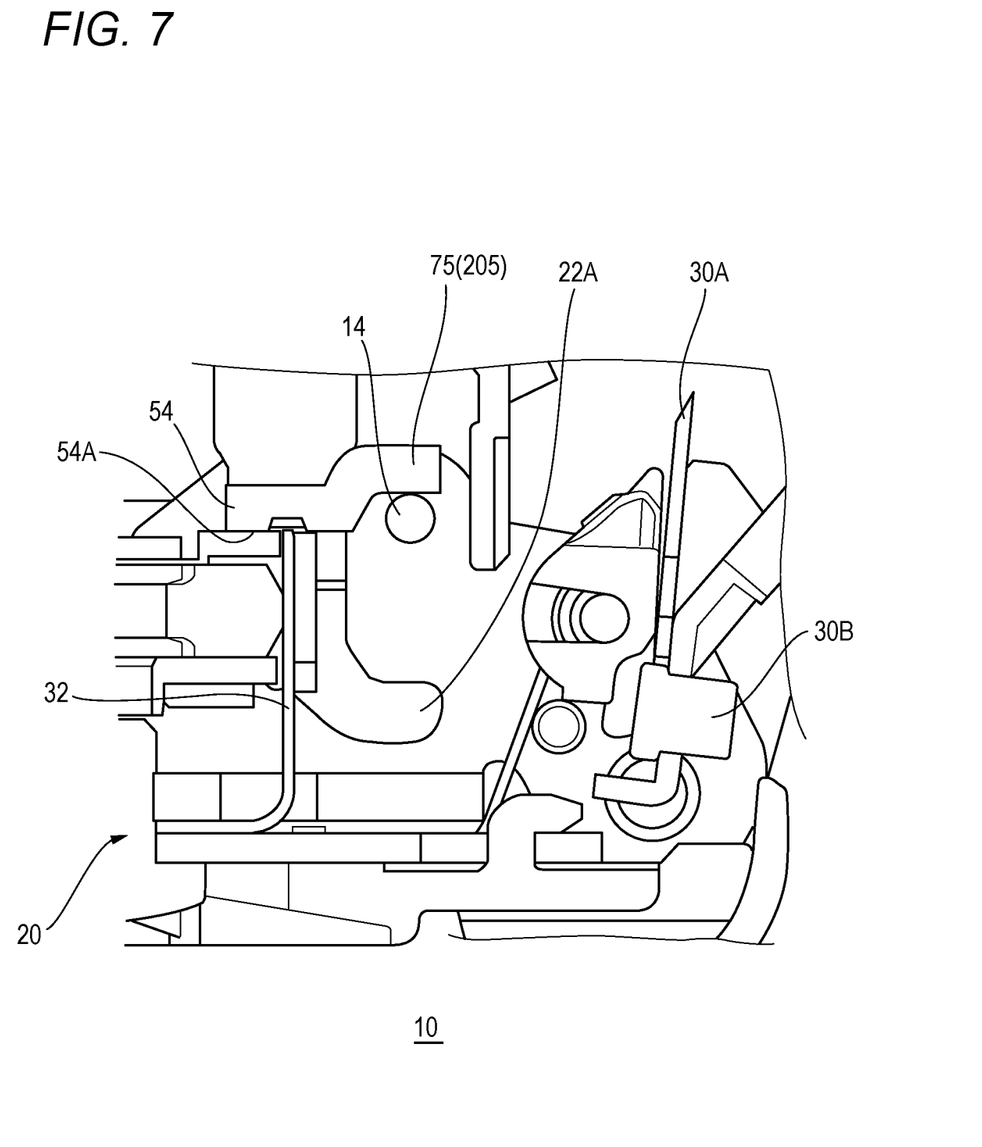
FIG. 7 is a cross-sectional view showing the regulating portion according to a third embodiment of the present invention.

FIG. 7 is a cross-sectional view showing the regulating portion 75 according to a third embodiment of the present invention. The third embodiment is different from the first embodiment in that the regulating portion 75 is a part of the clincher 54. As shown in FIG. 7, in the third embodiment, a part of the clincher 54 protrudes and abuts with the main handle 20 (for example, the shaft 14) to regulate the movement amount δ of the clincher 54.

According to the third embodiment, as in the first embodiment, a load to be applied to the staple driver 32 can be limited by regulating the movement amount δ of the clincher 54. Since the clincher 54 and the regulating portion 75 are integrally formed, a position of the regulating portion 75 is not displaced with respect to the clincher 54. A height of the clinch surface 54 can be regulated more accurately. Since the number of components is reduced, the manufacturing costs of the binding machine 10 can be reduced.

Fourth Embodiment

Figure 8:
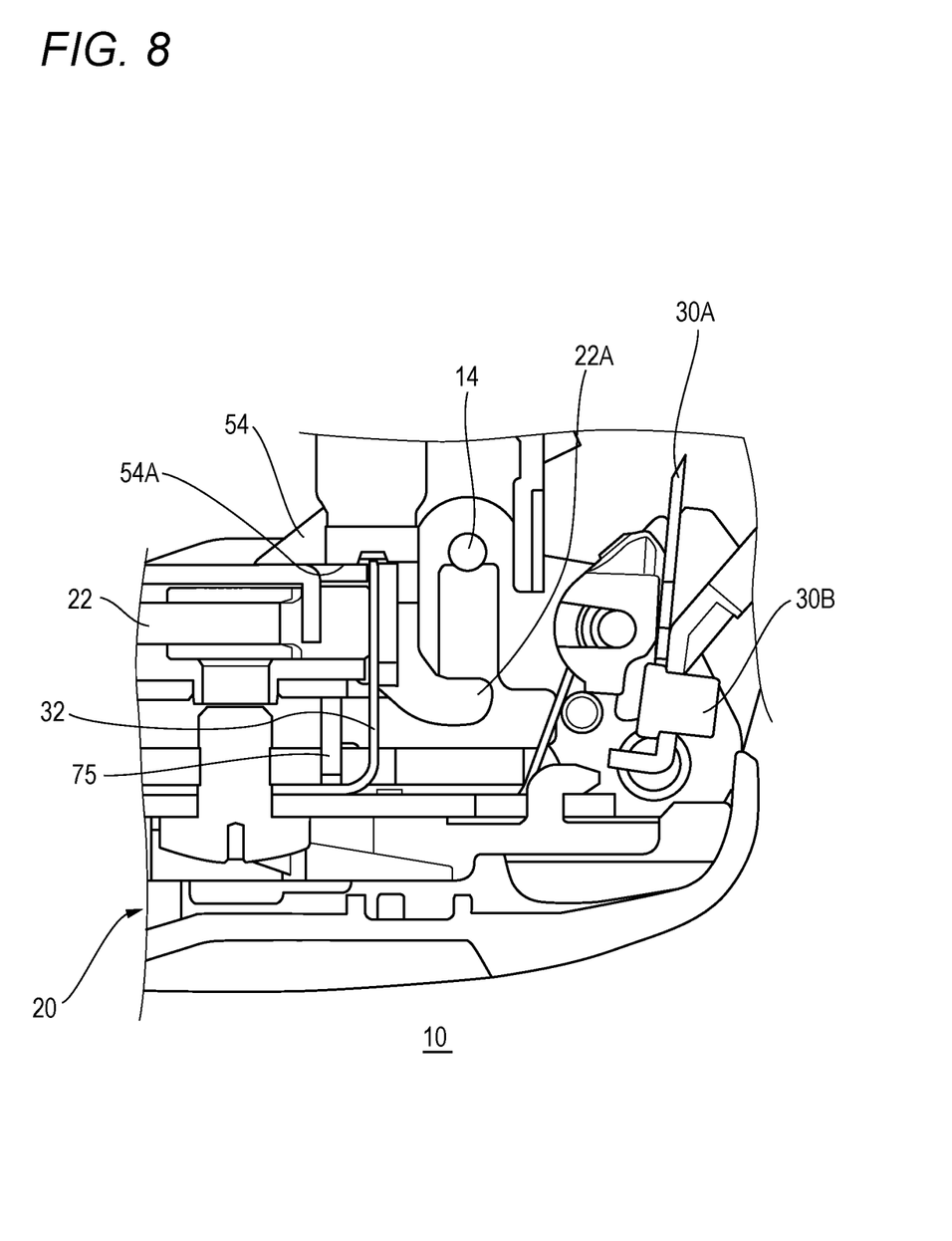
FIG. 8 is a cross-sectional view showing the regulating portion according to a fourth embodiment of the present invention.
Figure 9:
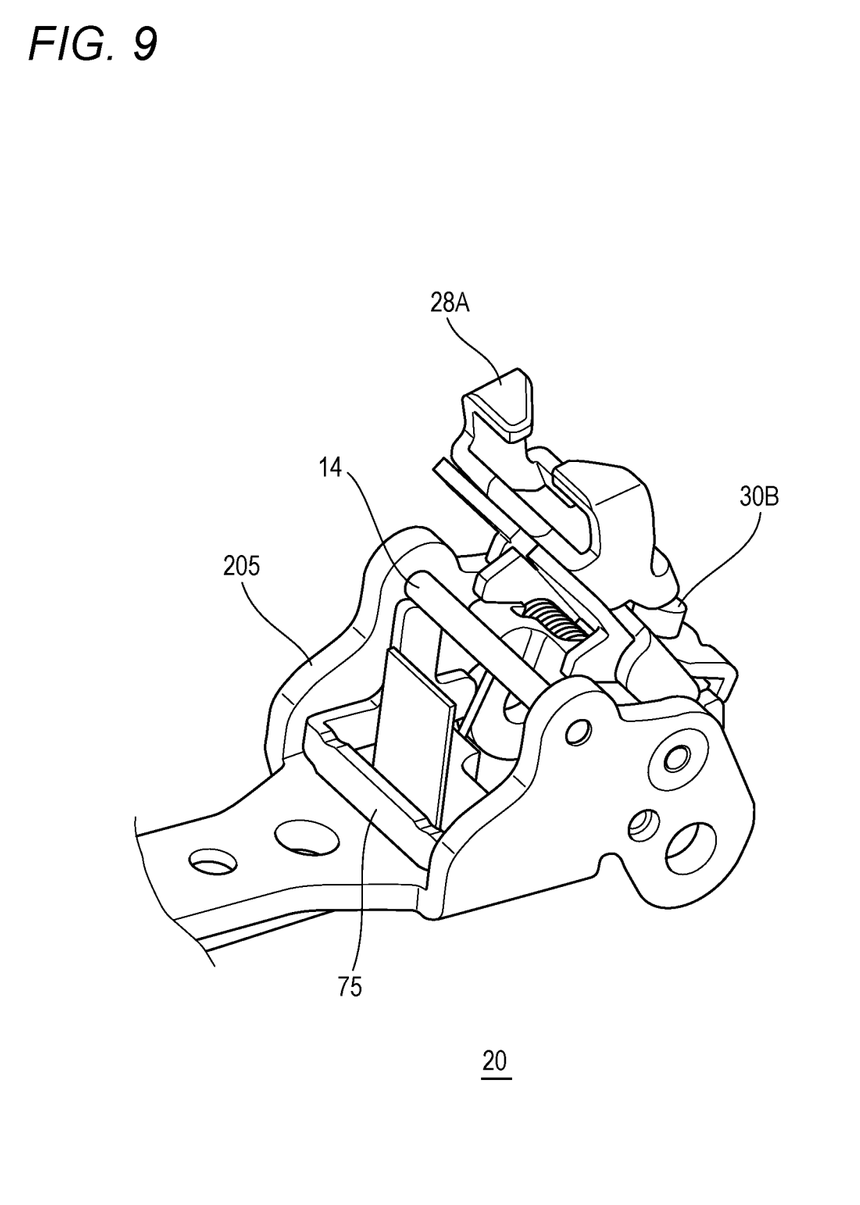
FIG. 9 is a perspective view of the regulating portion shown in FIG. 8 as viewed from a right rear side.

FIG. 8 is a cross-sectional view showing the regulating portion 75 according to a fourth embodiment of the present invention. FIG. 9 is a perspective view of the regulating portion 75 shown in FIG. 8 as viewed from a right rear side. The fourth embodiment is different from the first embodiment in that the regulating portion 75 abuts with the clinch surface 54A of the clincher 54 via the staple magazine unit 22. In other words, it can be said that the regulating portion 75 is configured by a combination of a first member 75 and a second member 22.

According to the fourth embodiment, as in the first embodiment, a load to be applied to the staple driver 32 can be limited by regulating the movement amount δ of the clincher 54. Since the regulating portion 75 does not directly abut with the clinch surface 54A of the clincher 54, the degree of freedom in design of the binding machine 10 is improved.

On the other hand, since the regulating portion 75 does not directly abut with the clincher 54, dimensional errors of other members interposed between the regulating portion 75 and the clincher 54 are included in the positioning accuracy of the clincher 54. Further, when the operating handle 70 is strongly gripped, the member sandwiched between the regulating portion 75 and the clincher 54 may be deformed.

Fifth Embodiment

Figure 10:
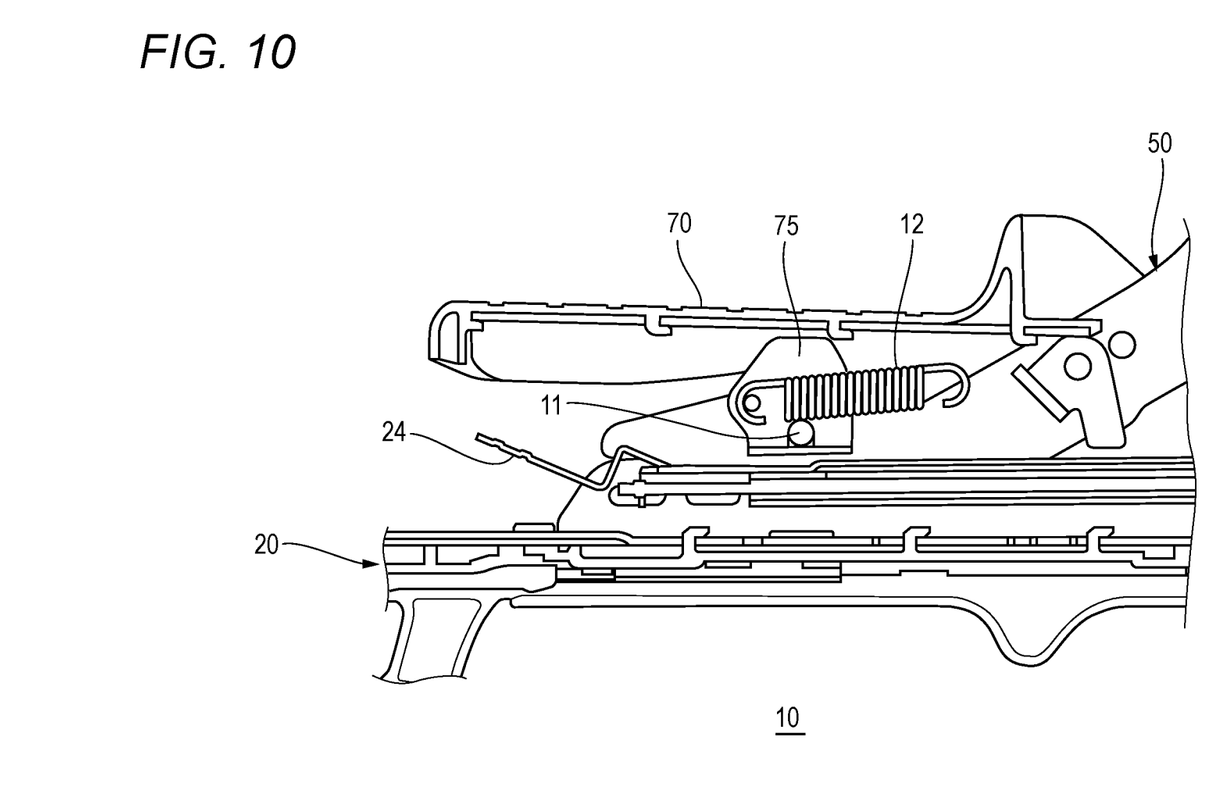
FIG. 10 is a cross-sectional view showing the regulating portion according to a fifth embodiment of the present invention.

FIG. 10 is a cross-sectional view showing the regulating portion 75 according to a fifth embodiment of the present invention. The fifth embodiment is different from the first to fourth embodiments described above in that the regulating portion 75 abuts with the operation handle 70 or the main handle 20 at a portion that faces the operation handle 70 instead of the clincher 54. When the regulating portion 75 abuts with the operation handle 70 or the main handle 20, the handle cannot be further gripped. Since the rotation amount of the clincher arm 50 driven by the operation handle 70 is regulated, the movement amount δ of the clincher 54 is regulated.

According to the fifth embodiment, as in the first embodiment, a load to be applied to the staple driver 32 can be limited by regulating the movement amount δ of the clincher 54. Since the regulating portion 75 can be disposed on an operation handle 70 side with a margin in space, instead of being disposed at a front end portion 201 of the main handle 20 having a large space restriction, the degree of freedom in design of the binding machine 10 is improved. On the other hand, since there is an error between a position of the operation handle 70 and a rotation amount of the clincher arm 50, it is difficult to accurately regulate the movement amount δ of the clincher 54 as compared with the first embodiment.

Sixth Embodiment

Figure 11:
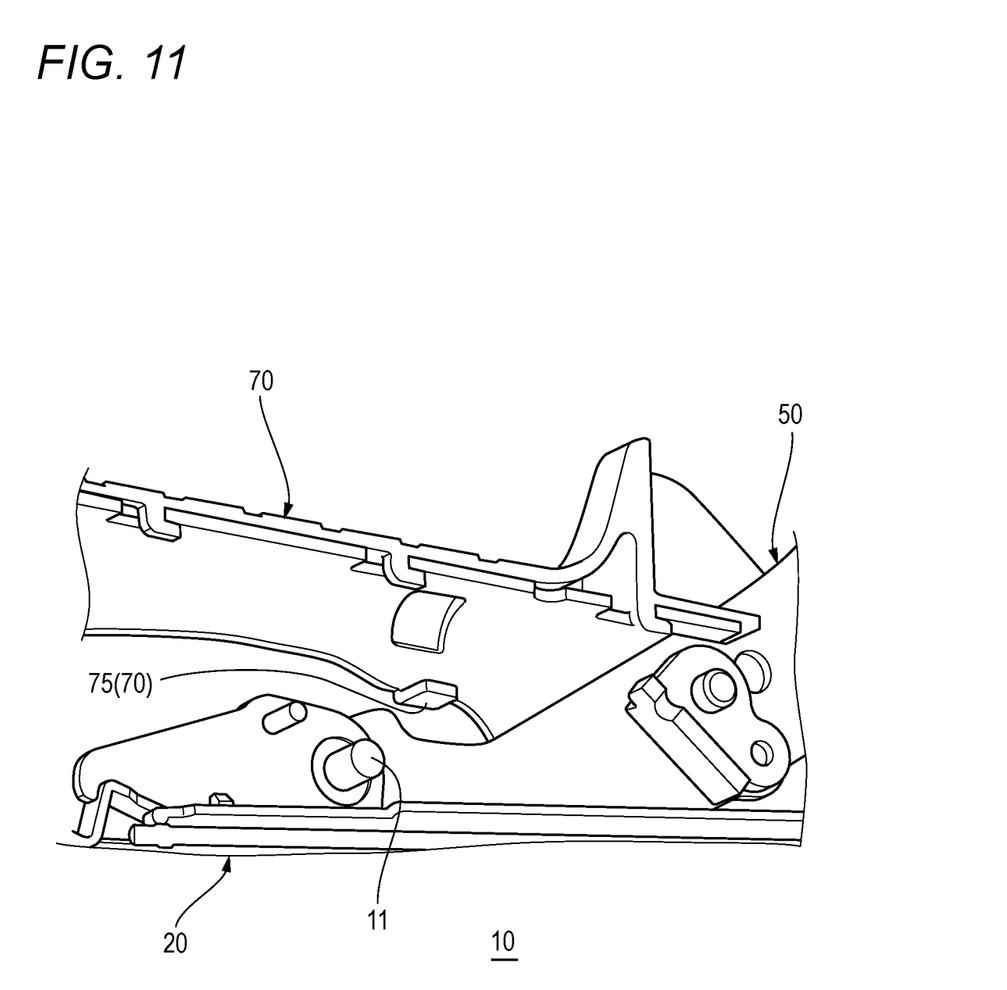
FIG. 11 is a cross-sectional view showing the regulating portion according to a sixth embodiment of the present invention.

FIG. 11 is a cross-sectional view showing the regulating portion 75 according to a sixth embodiment of the present invention. The sixth embodiment is different from the fifth embodiment in that the regulating portion 75 is formed integrally with the operation handle 70. According to the sixth embodiment, as in the fifth embodiment, a load to be applied to the staple driver 32 can be limited by regulating a rotation amount of the clincher arm 50.

If the operation handle 70 and the regulating portion 75 are formed integrally, a position of the regulating portion 75 is not displaced with respect to the operation handle 70. If the main handle 20 and the regulating portion 75 are formed integrally, the position of the regulating portion 75 is not displaced with respect to the main handle 20. The rotation amount of the clincher arm 50 can be regulated more accurately. Since the number of components is reduced, the manufacturing costs of the binding machine 10 can be reduced.

Further, in the sixth embodiment, instead of abutting the regulating portion 75 with the main handle 20, the regulating portion 75 may abut with the clincher aria 50 so as to restrict the rotation amount of the clincher arm 50 and limit the load to be applied to the staple driver 32.

Seventh Embodiment

Figure 12:
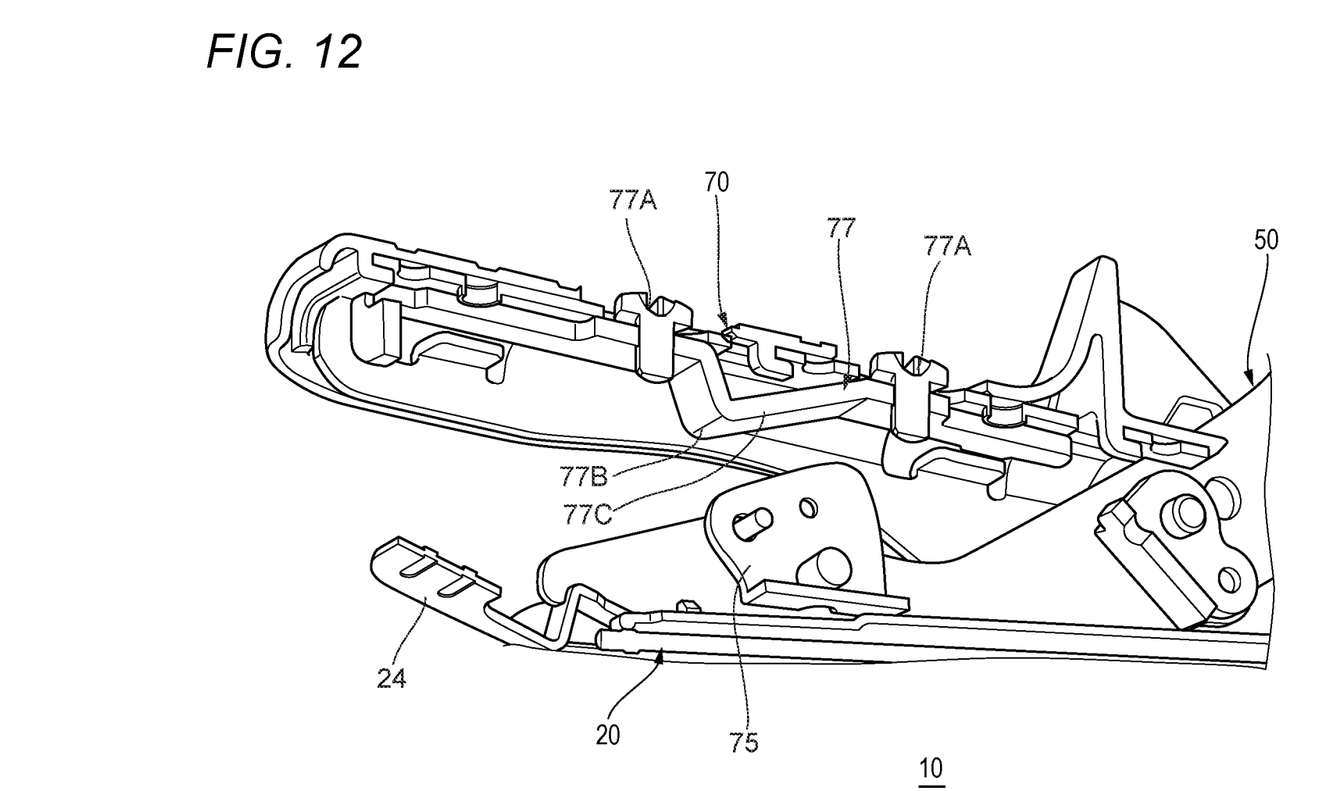
FIG. 12 is a cross-sectional view showing the regulating portion according to a seventh embodiment of the present invention.

FIG. 12 is a cross-sectional view showing the regulating portion 75 according to a seventh embodiment of the present invention. The seventh embodiment is different from the fifth embodiment in that a gap between the regulating portion 75 and an abutting member 77 that is to be abutted with the regulating portion 75 is adjustable. Specifically, a screw member 77A is loosened to change a position of the abutting member 77, then the screw member 77A is tightened, and thus a position of a protruding portion 77B of the abutting member 77 is changed. Thus, a gap between an inclined surface 77C of the abutting member 77 and the regulating portion 75 is adjusted. According to the seventh embodiment, as in the fifth embodiment, a load to be applied to the staple driver 32 can be limited by regulating a rotation amount of the clincher arm 50.

In a case where the regulating portion 75 is disposed on the operation handle 70 or on the main handle 20 at a portion facing the operation handle 70, it is difficult to accurately regulate the movement amount δ of the clincher 54 due to an error between a position of the operation handle 70 and the rotation amount of the clincher arm 50, which is an individual difference of the binding machine 10. According to the seventh embodiment, since the error can be adjusted for each individual binding machine 10, the movement amount δ of the clincher 54 can be accurately regulated.

The embodiments described above are for facilitating understanding of the present invention and are not to be interpreted as limiting the present invention. The elements included in the embodiments and their arrangements, materials, conditions, shapes, sizes, and the like are not limited to those illustrated, and can be appropriately changed. Further, it is possible to partially replace or combine the configurations shown in different embodiments. For example, although the staple ST is used as a means for binding both ends of a tape loop, the present invention is not limited thereto, and the tape loop may be bound by another means.

According to an aspect of the present invention, a binding machine, includes: a staple magazine unit configured to accommodate a staple having a crown portion and a pair of leg portions; a staple driver provided at a position facing the crown portion; a clincher provided at a position facing tip ends of the leg portions and movable along an extending direction of the leg portions; and a regulating portion configured to regulate a movement amount of the clincher toward the leg portions. The clincher and the staple driver are configured to sandwich the staple therebetween with a movement of the clincher along the extending direction toward the leg portions, folding the staple.

The regulating portion may regulate a movement amount of the clincher by abutting with a clinch surface of the clincher.

The binding machine may further include: a main handle to Which the staple magazine unit is attached; and a clincher arm including the clincher and rotatably attached to the main handle. The regulating portion may regulate a movement amount of the clincher by regulating a rotation amount of the clincher arm.

According to the present invention as described above, there is provided a binding machine that can limit a load to be applied to a staple driver and can prevent damage to the staple driver.

What is claimed is:

1. A binding machine, comprising:
   a staple magazine unit configured to accommodate a staple having a crown portion and a pair of leg portions;
   a main handle to which the staple magazine unit is attached;
   a staple driver provided at a position facing the crown portion; and
   a clincher arm which includes a clincher, the clincher arm rotatably attached to the main handle,
   the clincher having a clinch surface provided at a position facing tip ends of the pair of leg portions, the clincher being movable along an extending direction of the leg portions, the clincher moving toward the pair of leg portions when the clincher arm rotates,
   the binding machine being configured to sandwich the staple between the clinch surface of the clincher and the staple driver with a movement of the clincher along the extending direction toward the leg portions, folding the staple,
   the binding machine further comprises a regulating portion configured to regulate a movement amount of the clincher toward the leg portion by abutting with the clinch surface of the clincher,
   wherein the regulating portion abuts with the clincher surface when the clincher moves toward the pair of leg portions upon rotation of the clincher arm, whereby the regulating portion regulates the movement amount of the clincher,
   wherein the staple driver and the regulating portion are provided on the main handle, and
   wherein a position of the regulating portion on the main handle is fixed with respect to a position of the staple driver on the main handle.

2. The binding machine of claim 1, wherein the binding machine further includes a tape magazine unit which holds a tape for binding, and at least one tape guide for guiding tape fed from the tape magazine unit, and
   wherein the staple driver and the clincher are configured to staple tape fed from the tape magazine unit.

3. The binding machine according to claim 2,
   wherein the staple magazine unit and the tape magazine are provided on the main handle;
   the binding machine further including a tape holding unit provided on the clincher arm to hold tape fed from the tape magazine unit of the main handle; and
   wherein the binding machine is configured to staple overlapped tape with the staple driver and the clincher, after tape is fed from the main handle and held by the holding unit, as the clincher arm is rotated toward the main handle.

* * * * *